2,986,472
PENCIL CLAYS

Haydn H. Murray, Berkeley Heights, and Harold M. Johnson, Union, N.J., assignors to Georgia Kaolin Company, Elizabeth, N.J., a corporation of New Jersey No Drawing. Filed Feb. 18, 1959, Ser. No. 793,989

4 Claims. (Cl. 106—19)

This invention relates to clays specifically designed to be admixed with graphite employed as "lead" in pencils. More specifically, it deals with a particular mixture of an alkaline earth metal bentonite and kaolin, which may be so blended with graphite for the purposes set forth.

The main ingredients in pencil "lead" are clay and graphite. These are mixed into a slip and extruded into straight cylindrical lengths, and then dried and fired. After firing, the leads are dipped into wax before they are used as lead pencils.

To be suitable for pencil use, a clay, when mixed with graphite, must have adequate green and dry strength, and a high fired strength. It must be of a type which will not cause splitting during drying or firing, and it must be at least semi-refractory. The materials must have dimensional stability and yet be sufficiently plastic with graphite to enable extrusion into proper shape. Furthermore, the clay must have a particle size distribution compatible with the graphite particles to give the optimum writability, i.e., the lead must be black and soft without undue sacrifice of hardness qualities.

In spite of numerous attempts in this country to produce a satisfactory natural clay for quality leads, a suitable processed clay material has never been commercially available, and the product now employed is an imported clay. During the war when the imported clays were not available, a substitute clay, a Mississippi ball clay, was used. However, it had many disadvantages, so that when the imported clay again became available, use of American product was discontinued in quality leads.

The clay of the present invention has been found not only to equal the imported product, but also to surpass it in many respects. The material is composed of two ingredients: (1) about 10% to about 70% by weight of a natural alkaline earth metal bentonite, such as calcium and/or magnesium bentonite, sold on the market as southern bentonite, and (2) about 90% to about 30% kaolin, particularly Georgia kaolin of ultrafine particle size.

The alkaline earth metal bentonite used is a non-swelling pulverized commercial bentonite which has been degritted by flotation, centrifuging, or similar process. The kaolin used should have a particular size such that 100% is less than 2 microns and 95% is less than one micron.

The proportions specified are critical in that if more than about 70% by weight of the specified bentonite is employed, excessive shrinkage takes place on firing and the mixture does not possess adequate firing properties. Also, if less than 10% thereof is used, the strength and plastic properties of the mixed clay become unsuitable. A preferred range of about 40% to 60% of the specified bentonite gives a product possessing the best characteristics for pencil lead use.

Example

As an example, a clay suitable for production of pencils of HB hardness may be mentioned. Such a clay of the present invention may be prepared by mixing 60% by weight of calcium bentonite, as hereinabove specified, and 40% of Georgia kaolin, as specified. This was admixed with the required proportion of powdered graphite (35% clay to 65% by weight of graphite), mixed in slip form, concentrated, and extruded into pencil lead, dried, fired, and waxed. Another set of lead was prepared in the same manner with the exception that the imported clay recommended for the HB pencil lead, was employed instead of the bentonite-kaolin mixture of the present invention.

It was found that the extrusion properties of the slip containing the clay of the present invention were considerably better than those of the imported product.

In order to test the strength of the lead point, the ends of samples were sharpened to 0.025 inch and 0.05 inch points, and pressure was applied by a modified Toledo scale machine, wherein the points were pressed against an agate plate at a 45° angle. The pressure applied to the lead was recorded until the point broke. Tests were made in triplicate, and the results obtained with the imported clay product and that of the present invention are given as follows (these values are after the leads have been waxed and bonded):

| | Pressure, Lb. | |
| --- | --- | --- |
| | Imported Clay | Present Invention |
| 0.025" Needle Point | 2.2 to 2.4 | 3.6 (no variation). |
| 0.05" Blunt Point | 3.5 to 4.5 | 7.5 to 8+. |

It may be noted here that the pressure limit of the testing machine is 8 lb. It will be observed that the lead containing the clay of the present invention exhibited considerably higher strengths over the standard imported product now employed, which amounted to an average of 60% increase in strength after waxing and bonding.

Based on numerous tests under comparative conditions, it has been found that the clay of the present invention, when compared with the imported composition, produces a more uniform lead, gives better writability and more uniform blackness, and exhibits less warpage and breaking during drying after extrusion. Yields can be expected to improve as much as 35% with this new clay-graphite composition.

When a slip of pencil lead mixture is extruded, there usually develop concentric rings having variable radial strengths throughout the length of the lead. Thus, when a pencil is sharpened, the radial stress applied will cause breakage in lead in the weak radial portions heretofore mentioned. However, when the clay of the present invention is employed in the lead, the product obtained possesses extraordinary homogeneity to such a degree that breakage during sharpening is greatly reduced.

Another observation made in the tests involves hardness of the lead. Heretofore, in the case of the imported product, strength of the lead increased with the hardness of the pencil lead. In the case of the clays of the present invention, pencil leads made therefrom exhibit a much higher strength (60% average) without increasing the hardness of the lead at the same lead diameter, thereby eliminating the low strength objections usually attributed in the trade to pencil leads of lower hardness.

Strength improvement of waxed leads of the present invention show even greater improvement over the imported product. For example, in one instance, a 50–50 mixture by weight of the specified calcium bentonite and specified Georgia kaolin employed in a 2 hardness pencil lead showed a lead strength 50% greater than that with the same amount of imported product. After waxing impregnation of both leads, the leads of the present invention showed strengths twice those of the leads with the imported clay.

By varying the ratio of the clay and graphite, leads of various hardness can be made. It was found that when the percentage of this clay mixture was above 35% of the total, that excessive shrinkage developed. By admixing a kaolin of the same particle size distribution as the graphite, clay percentages as high as 70% could be attained which resulted in a pencil of 9H hardness. Thus, a full range of hardnesses from HB to 9H can be made by controlling the ratio of the alkaline earth metal bentonite-fine kaolin mixture, the coarse kaolin (for pencils requiring clay percentages above 35%) and graphite. Other conventional ingredients, such as dyes, may be added to the clay mixture, if desired.

We claim:

1. A pencil lead clay composition essentially consisting of about 10% to about 70% by weight of a degritted alkaline earth metal bentonite and about 90% to about 30% of a kaolin having a particle size of 100% less than two microns and 95% less than one micron.

2. A pencil lead essentially consisting of a powdered graphite admixed with a clay composition comprising about 10% to about 70% by weight of a natural degritted alkaline earth metal bentonite, and about 90% to about 30% of a kaolin having a particle size of 100% less than two microns and 95% less than one micron.

3. A pencil lead essentially consisting of a powdered graphite admixed with a clay composition essentially consisting of about 40% to about 60% by weight of a calcium bentonite, and about 60% to about 40% of a Georgia kaolin having a particle size of 100% less than two microns and 95% less than one micron.

4. A pencil lead, according to claim 3 essentially consisting of a powdered graphite with from 10% to 35% of the clay composition and 0 to 35% of a kaolin clay having a particle size distribution comparable to that of the powdered graphite.

References Cited in the file of this patent

UNITED STATES PATENTS

| | | |
|---|---|---|
| 2,060,393 | Heyroth | Nov. 10, 1936 |
| 2,230,939 | Dunbeck | Feb. 4, 1941 |
| 2,348,315 | Vaughan | May 9, 1944 |
| 2,355,639 | Ferst et al. | Aug. 15, 1944 |
| 2,398,559 | Robinson | Apr. 16, 1946 |
| 2,566,753 | Van Dusen et al. | Sept. 4, 1951 |

OTHER REFERENCES

Volclay, Data No. 202, (1936).

Volclay Bentonite, "Bentonite in Ceramics," about 1956.